A. C. THORNTON.
MECHANISM CARRIED BY AIRCRAFT FOR ADJUSTING TORPEDOES.
APPLICATION FILED SEPT. 1, 1921.
1,420,592.
Patented June 20, 1922.
2 SHEETS—SHEET 1.
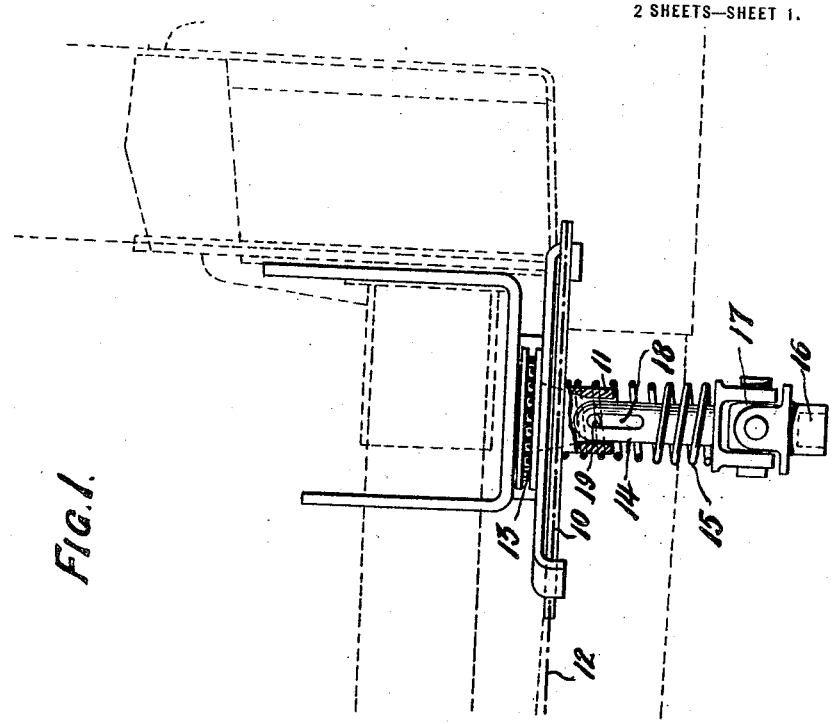
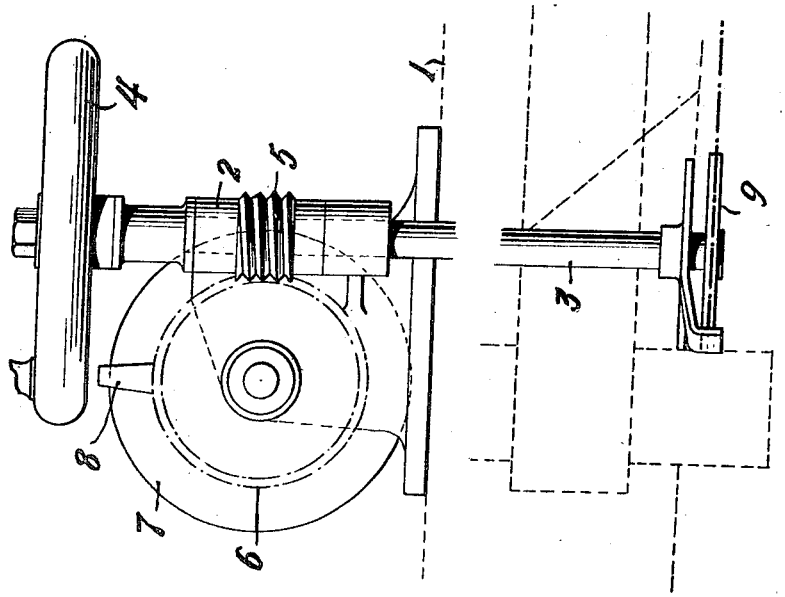

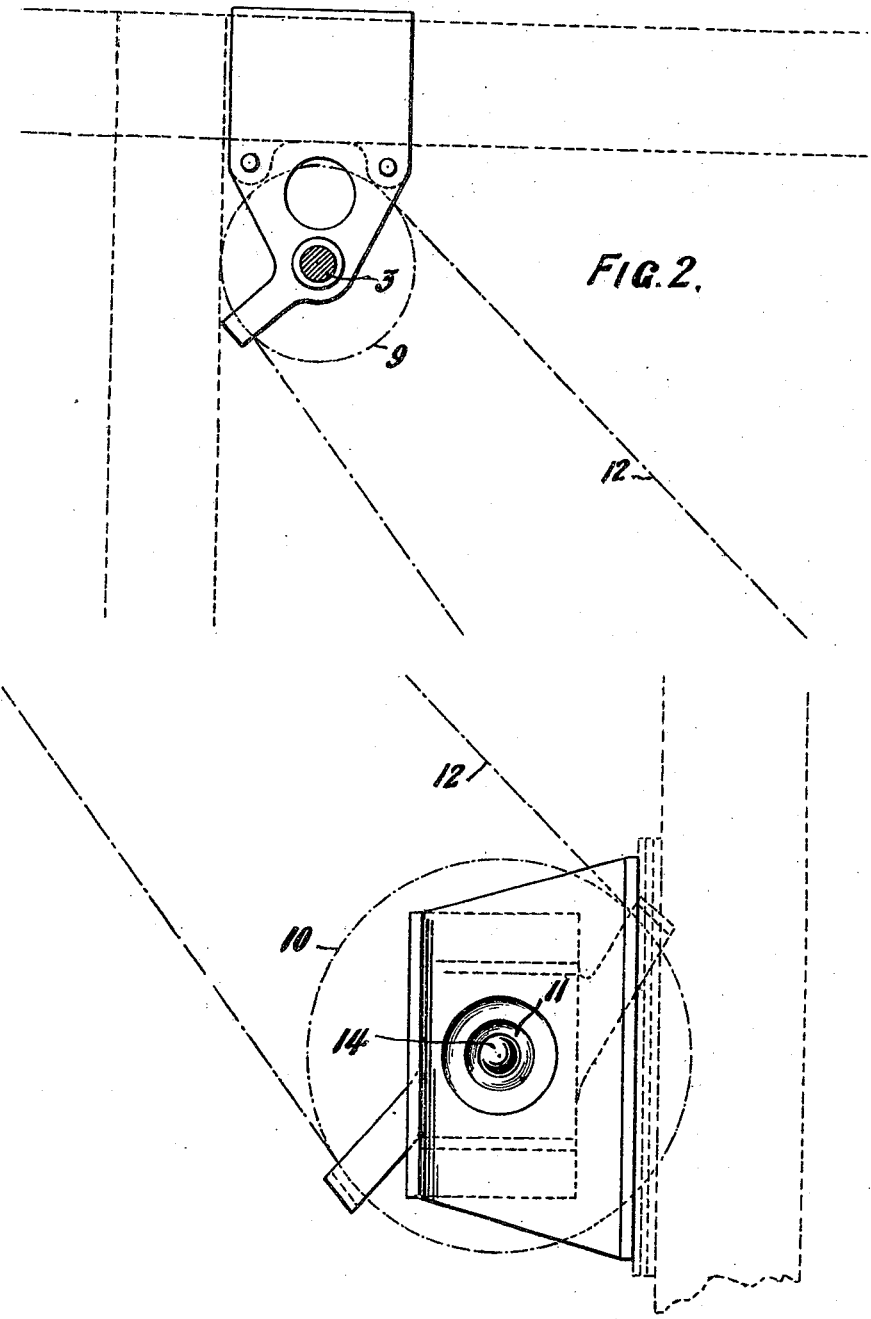

UNITED STATES PATENT OFFICE.

ARTHUR CYRIL THORNTON, OF LEEDS, ENGLAND, ASSIGNOR TO THE BLACKBURN AEROPLANE & MOTOR COMPANY LIMITED, OF LEEDS, ENGLAND.

MECHANISM CARRIED BY AIRCRAFT FOR ADJUSTING TORPEDOES.

1,420,592.  Specification of Letters Patent.  Patented June 20, 1922.

Application filed September 1, 1921. Serial No. 497,575.

*To all whom it may concern:*

Be it known that I, ARTHUR CYRIL THORNTON, a subject of the King of Great Britain, residing at Leeds, Yorkshire, England, have invented certain new and useful Improvements in Mechanism Carried by Aircraft for Adjusting Torpedoes, of which the following is a specification.

This invention relates to mechanism carried by aircraft for adjusting torpedoes.

In torpedo-carrying aircraft and more particularly in torpedo-carrying aeroplanes flying machines in which the torpedo is slung beneath the fuselage or equivalent, it is essential that certain mechanism or mechanisms of the torpedo by which the depth of immersion and travel of the torpedo is regulated after its discharge, shall be operated and set by the pilot during the flight of the air-craft and prior to the discharge of the torpedo, and it is usual to effect the setting of such mechanisms of the torpedo by the pilot or person in charge carrying out the operations directly by hand, as by applying a key to a revoluble stud or studs or equivalents on the body of the torpedo, and the effecting of these adjusting operations directly by hand is obviously difficult and troublesome.

Now the object of the present invention is to provide an improved mechanism fitted and carried upon the fuselage or equivalent of the aircraft and engaging the device by which the said adjustments are effected, whereby such adjustment mechanism can be set as required by hand-operated mechanical means and the degree of such setting indicated upon a dial or equivalent; furthermore the further object is to bring the devices to be operated by the aviator within easy and convenient reach, although the depth adjusting stud of the torpedo may be at a distance and in a position (as is frequently the case) which would not be conveniently accessible for hand operation.

The invention which will be hereafter described, is applied as aforesaid to that mechanism of the torpedo by which its depth of immersion and travel is regulated after its discharge, and the adjustment of such mechanism of the torpedo is effected by operating a revoluble stud or equivalent on the body of the said torpedo and revolving the said stud through a requisite angle or number of revolutions, and it is to such a stud that the mechanism according to this invention will be described as being applied, the actual mechanism of the torpedo itself not being dealt with in this specification since it does not form a portion of this invention.

According to this invention, supported in bearings by the fuselage framework is an approximately vertical operating shaft, which shaft is fitted with a hand operating wheel or equivalent for the aviator at its upper end and has a sprocket wheel at or near its lower end.

An endless driving chain passes around the sprocket wheel of the operating shaft and around a sprocket wheel fixed to an approximately vertical adjustment shaft which is at a distance from the operating shaft. The adjustment shaft is carried in suitable bearings in which it is free to revolve and it comprises a member which is telescopically movable in the direction of the axis of the adjustment shaft, such telescopic member being normally held by a spring in its extended position in a downward direction.

The telescopic member of the adjustment shaft carries upon its lower end, which extends beneath the fuselage, a key of a form suitable to engage the operating stud of the depth adjusting gear of the torpedo; and such a key is connected to the end of the telescopic member by a universal joint of any known construction which will permit of the axis of the key being at an angle to the axis of the adjustment shaft, while still being revolved therewith; and the telescopic member is also so constructed that while being free to have resilient motions in the direction of the axis of the adjustment shaft, it must revolve therewith.

The adjustment shaft may be carried at its upper end, by a universal joint or by any suitable means which may serve to support the bearings of the said adjustment shaft so that the latter shaft has freedom of motion, and in some cases it is sufficient in practice to allow a considerable degree of freedom in the bearing at the top of the adjustment shaft.

Geared to the operating shaft, carrying the hand wheel, is an indicating mechanism of any suitable character, as for instance, a worm on the operating shaft may engage a worm wheel through which an indicating dial may be moved to show by means of a fixed pointer, the extent of operation of the depth adjusting stud of the torpedo.

In order to enable the invention to be clearly understood reference is made to the accompanying drawings in which Fig. 1 shows in side elevation and Fig. 2 in sectional plan view so much of an adjusting mechanism as is necessary to illustrate the construction according to this invention and which is suitable for adjusting that mechanism of a torpedo by which its depth of immersion and travel is regulated after its discharge.

In these figures, 1 indicates a portion of the frame work of the fuselage of an aeroplane flying machine and upon this framework 1 in a position within easy reach of the pilot are mounted the bearings 2 for supporting an approximately vertical operating shaft 3 and the shaft 3 is fitted with a hand operating wheel 4 for the aviator at its upper end and with a worm 5 which may engage a worm wheel 6 by means of which an indicating dial 7 may be moved to show by means of a fixed pointer 8 the extent of operation of the depth adjusting stud of the torpedo. The operating shaft 3 also carries at or near its lower end a sprocket wheel 9.

Around the sprocket wheel 9 of the operating shaft 3 and around a sprocket wheel 10 fixed to an approximately vertical adjustment shaft 11 is passed an endless driving chain 12 and the said adjustment shaft 11 is situate at a distance from the said operating shaft 3.

The adjustment shaft 11 is mounted in suitable anti-friction or ball bearings 13 and comprises a member 14 which is telescopically movable in the direction of the axis of the adjustment shaft 11 and the said telescopic member 14 is normally held in its extended position in a downward direction by means of a compression spring 15.

The telescopic member 14 of the adjustment shaft 11 carries upon its lower end, which extends beneath the fuselage, a key 16 of a form suitable to engage the operating stud of the depth adjusting gear of the torpedo and the key 16 is connected to the end of the telescopic member 14 by a universal joint 17 as shown in Fig. 1, so as to permit of the axis of the key 16 being at an angle to the axis of the adjustment shaft 11 while still being revolved therewith.

The telescopic member 14 is slotted at 18 and a pin 19 connects the said member 14 to the adjustment shaft 11 so that while being free to have resilient motions in the direction of the axis of the adjustment shaft 11, it must also rotate therewith.

With such mechanism as above described the torpedo is placed in position and detachably secured by the usual means beneath the fuselage, and in so placing the torpedo, the depth adjusting stud thereon is pressed upwards into engagement with the key 16 of the adjustment shaft 11, slightly lifting the telescopically carried key 16 against the action of the spring 15 so that the key 16 is resiliently held in engagement; and owing to the key 16 being carried on the slotted member 14 by the universal joint 17, the effective operation of the depth adjusting stud is not prevented by any slight inaccuracy in the positioning of the torpedo.

It will thus be readily seen that the pilot, by manipulating the hand operating wheel 4, will by means of the sprocket wheels 9 and 10 and the endless driving chain 12, rotate the adjustment shaft 11, resilient telescopic member 14 and key 16 and thereby operate the stud of the depth adjusting gear of the torpedo, while at the same time the amount of movement given to the turning gear will be indicated to the pilot by means of the indicating dial 7 and the fixed pointer 8 and at the same time the operation of the mechanism will not be affected either by the resilient deflection of the framework of the fuselage carrying the mechanism or by comparatively small movements of the torpedo itself relatively to the said fuselage framework.

What I claim as my invention and desire to secure by Letters Patent is:—

1. Mechanism carried upon aircraft for operating from a distance the adjustment studs of torpedoes also carried by said aircraft for the purpose of regulating the depth of immersion and travel of the said torpedoes; comprising a revoluble operating shaft, bearings on the framework of said aircraft to carry said operating shaft, a hand operable member on said operating shaft by which the pilot can revolve said shaft, a revoluble adjustment shaft at a distance from said operating shaft, bearings to carry said adjustment shaft, means for communicating rotary motion from said operating shaft to said adjustment shaft, a telescopic member constituting a coaxial extension of said adjustment shaft, carried thereby and revolving therewith, means for permitting said telescopic member to have movement in the direction of the axis of said adjustment shaft, a spring to hold said telescopic member in extension, a key to engage said stud of said torpedo, and a universal joint connecting said key to said telescopic member.

2. Mechanism carried upon aircraft for operating from a distance the adjustment studs of torpedoes also carried by said aircraft for the purpose of regulating the depth of immersion and travel of said torpedoes; comprising a revoluble operating shaft, bearings on the framework of said aircraft to carry said operating shaft, a hand operable member on said operating shaft by which the pilot can revolve said shaft, a revoluble adjustment shaft at a distance from said operating shaft, bearings to carry said adjustment shaft, means for communicating rotary motion from said operating shaft to said adjustment shaft, a telescopic member constituting a coaxial extension of said adjustment shaft, carried thereby and revolving therewith, means for permitting said telescopic member to have movement in the direction of the axis of said adjustment shaft, a spring to hold said telescopic member in extension, a key to engage said stud of said torpedo, a universal joint connecting said key to said telescopic member, and means operated by said operating shaft to indicate the rotary movement given to said stud of said torpedo.

3. Mechanism carried upon aircraft for operating from a distance the adjustment studs of torpedoes also carried by said aircraft for the purpose of regulating the depth of immersion and travel of said torpedoes; comprising a revoluble operating shaft, bearings on the framework of said aircraft to carry said operating shaft, a hand operable member on said operating shaft by which the pilot can revolve said shaft, a revoluble adjustment shaft at a distance from said operating shaft, bearings to carry said adjustment shaft, pulleys mounted respectively on said operating shaft and said adjustment shaft, an endless flexible connection passing around said pulleys to gear said shafts together, a telescopic member constituting a coaxial extension of said adjustment shaft, carried thereby and revolving therewith, means for permitting said telescopic member to have movement in the direction of the axis of said adjustment shaft, a spring to hold said telescopic member in extension, a key to engage said stud of said torpedo, a universal joint connecting said key to said telescopic member, and means operated by said operating shaft to indicate the rotary movement given to said stud of said torpedo.

4. Mechanism carried upon aircraft for operating from a distance the adjustment studs of torpedoes also carried by said aircraft for the purpose of regulating the depth of immersion and travel of said torpedoes; comprising a revoluble operating shaft, bearings on the framework of said aircraft to carry said operating shaft, a hand operable member on said operating shaft by which the pilot can revolve said shaft, a revoluble adjustment shaft at a distance from said operating shaft, bearings to carry said adjustment shaft, a sprocket wheel fixed on said operating shaft, a sprocket wheel fixed on said adjustment shaft, an endless driving chain passing around said sprocket wheels to flexibly gear together said operating shaft and said adjustment shaft, a telescopic member constituting a coaxial extension of said adjustment shaft, carried thereby and revolving therewith, means for permitting said telescopic member to have movement in the direction of the axis of said adjustment shaft, a spring to hold said telescopic member in extension, a key to engage said stud of said torpedo, a universal joint connecting said key to said telescopic member, and means operated by said operating shaft to indicate the rotary movement given to said stud of said torpedo.

5. Mechanism carried upon aircraft for operating from a distance the adjustment studs of torpedoes also carried by said aircraft for the purpose of regulating the depth of immersion and travel of said torpedoes; comprising a revoluble operating shaft, bearings on the framework of said aircraft to carry said operating shaft, a hand operable member on said operating shaft by which the pilot can revolve said shaft, a revoluble adjustment shaft at a distance from said operating shaft, bearings to carry said adjustment shaft, means for communicating rotary motion from said operating shaft to said adjustment shaft, a telescopic member constituting a coaxial extension of said adjustment shaft, carried thereby and revolving therewith, means for permitting said telescopic member to have movement in the direction of the axis of said adjustment shaft, a spring to hold said telescopic member in extension, a key to engage said stud of said torpedo, a universal joint connecting said key to said telescopic member, and means to indicate the extent of operation of said stud of said torpedo, comprising a revoluble indicating dial adjacent the pilot, a fixed pointer to indicate on said dial, and gearing between said operating shaft and said indicating dial to revolve the latter.

In witness whereof I have hereunto set my hand in the presence of two witnesses.

ARTHUR CYRIL THORNTON.

Witnesses:
 EDWIN HUDSON,
 MINNIE LEES.